United States Patent [19]
Young

[11] 3,988,731
[45] Oct. 26, 1976

[54] AUGMENTED PERSPECTIVE RADAR DISPLAY

[76] Inventor: David W. Young, 627 N. Beachwood Dr., Burbank, Calif. 91506

[22] Filed: May 28, 1975

[21] Appl. No.: 581,638

Related U.S. Application Data

[63] Continuation-in-part of Ser. No. 385,534, Aug. 3, 1973, Pat. No. 3,896,432.

[52] U.S. Cl. .......................... 343/5 LS; 343/5 EM; 343/5 SC
[51] Int. Cl.² .......................................... G01S 9/02
[58] Field of Search ............... 343/5 R, 5 EM, 5 LS, 343/5 SC

[56] References Cited
UNITED STATES PATENTS

| | | | |
|---|---|---|---|
| 3,653,044 | 3/1972 | Breeze et al. | 343/5 SC |
| 3,716,866 | 2/1973 | Mason | 343/5 LS X |
| 3,778,821 | 12/1973 | Young | 343/5 LS |
| 3,866,222 | 2/1975 | Young | 343/5 LS |

Primary Examiner—T.H. Tubbesing
Attorney, Agent, or Firm—Ralph B. Pastoriza

[57] ABSTRACT

Control circuits are provided in a perspective radar display to modify the vertical sweep wave form voltage function on the display cathode ray tube to correspond to the sweep function which would be provided if the observer and radar antenna were at a different position from the actual position. This different position may constitute a different altitude or a different range or a combination of both. If the perspective display is used in an aircraft flying at, for example, 100 feet, the pilot can modify the display to provide a perspective radar image as would appear if the aircraft were at an altitude, for example, of 500 feet or 5,000 feet thereby rendering more easily distinguishable distant objects close to the horizon. Alternatively or in combination with a simulated or augmented altitude, the pilot can effectively modify the display to effectively provide a display which would occur at an increased range from targets so that close in targets are rendered visible. The same principles are applicable to boats and ships.

19 Claims, 17 Drawing Figures

AUGMENTED PERSPECTIVE RADAR DISPLAY

This application is a continuation-in-part of my co-pending patent application Ser. No. 385,534 filed Aug. 3, 1973, now U.S. Pat. No. 3,896,432, and entitled PERSPECTIVE RADAR AIRPORT RECOGNITION AND LANDING GUIDANCE SYSTEM.

This invention relates to perspective radar systems and more particularly to a method and apparatus for augmenting a perspective radar display in such a manner as to provide a display in perspective as would appear if the observer were at a different posiition from his actual position.

BACKGROUND OF THE INVENTION

Linear perspective radar systems for approach and landing of aircraft have been disclosed in my previous U.S. Pat. No. 3,778,821, issued Dec. 11, 1973 of which the aforementioned parent application Ser. No. 385,534 is a continuation-in-part.

Essentially, the basic concept of the perspective radar system as disclosed in the above-mentioned U.S. Pat. No. 3,778,821 is the display on a radar scope of a view of targets in front of the aircraft such as received from the terrain or an airport complex in perspective which coincides exactly on a one-to-one basis with a visual view of such terrain or airport complex on a clear day.

While the conventional perspective radar view as well as the actual visual view aids a pilot greatly, during taxi or roll-out of an aircraft the perspective radar as well as the visual perspective view has limited use. It is a common occurrence for pilots on a clear day to be directed where to taxi by the control tower when the airport is unfamiliar to the pilot because the pilot is so low to the ground, particularly in smaller aircraft, that the various taxi-ways and runways are difficult to visually detect. The same situation obtains if the perspective radar is used since all of the targets are compressed close to the horizon and cannot readily be distinguished. Similar conditions exist in the case of boats or ships where a perspective radar might be used but wherein the height of the antenna is at a relatively low altitude. With the use of a perspective radar such as described in my referred to prior U.S. patent, other target ships or boats would appear compressed together close to the horizon as compared to their appearance as targets if the radar and observer were positioned at a substantially higher altitude.

A further limitation of the conventional perspective radar is the ability to detect close in targets. As an aircraft or boat approaches a runway or a mooring, the nearer video signals will disappear from the display simply because the time for the radar pulse to reach the target and return is so short as not to be detectable at the starting of the vertical sweep of the display tube.

BRIEF DESCRIPTION OF THE PRESENT INVENTION

With the foregoing in mind, the present invention contemplates a method of altering the display provided by a perspective radar system to provide a display in perspective as would appear if the observer were at a different position from his actual position. This different position may be in altitude, in range, or a combination of both.

Essentially, the basic method contemplates modifying the sweep wave form voltage function applied to the vertical input of the cathode ray tube display to correspond substantially to that which would be generated if the radar antenna were at such different position. As a consequence, the targets viewed on the display assume the positions they would if the observer were actually at such different position.

The augmented perspective radar system in accord with the invention comprises the basic components of a perspective radar including antenna means for transmitting radar pulses in a fan-shaped beam lying in a vertical plane and including means for moving the beam in aximuth over a given azimuth angle; radar transmitter and receiver means connected to the antenna means for transmitting the beam at a given pulse repetition frequency and receiving echo signals from targets intercepting the beam, the echo signals being delayed in time in proportion to the ranges of the targets respectively; sweep and control circuit means responsive to the given pulse repetition rate for generating an increasing sweep wave form voltage function at a frequency corresponding to the pulse repetition frequency; display means having horizontal, vertical and video inputs, the horizontal input being controlled in accordance with the position of the beam in azimuth, the vertical input being connected to receive the sweep wave form voltage function and the video input being connected to receive video signals; an actual altitude generating means for generating an actual altitude signal corresponding to the actual altitude of the antenna means above the ground; and, an altitude control circuit means connected to the sweep and control circuit means receiving the actual altitude signal to shape the sweep wave form voltage function such that the resulting display constitutes a perspective view. In the normal perspective radar this sweep wave form voltage constitutes a hyperbolic function of time.

In accord with the present invention, there is provided in combination with the foregoing basic components, an additional control means for modifying the sweep wave form voltage function to thereby provide a perspective display which would appear if the observer and radar antenna were at a physical location different from their actual position.

In a first instance, this additional control means generates a simulated altitude signal representative of a desired selected altitude and may be manually controlled, the simulated altitude signal being combined with the actual altitude signal to cause generation of a sweep wave form voltage function corresponding to that which would be generated at a resulting augmented altitude. The augmented altitude may be greater or less than the actual altitude.

In addition, the control means includes a pulse delay circuit means receiving the pulse repetition frequency signals and including manual controllable means for adjusting the delay circuit to effect a desired delay of the time the pulse repetition frequency signals trigger the transmitter relative to the time of initiation of the sweep wave form voltage function so that targets appear to be at a further range on the display than would be the case in the absence of a delay substantially the same as though the observer and radar antenna were physicaly positioned at a greater range from the targets so that close in targets appear on the display.

The manual control of altitude and range can be effected separately or in combination to provide the desired augmented display.

BRIEF DESCRIPTION OF THE DRAWINGS

A better understanding of the method and system of this invention will be had by referring to the accompanying drawings in which.

DETAILED DESCRIPTION OF THE INVENTION

Figure 1:
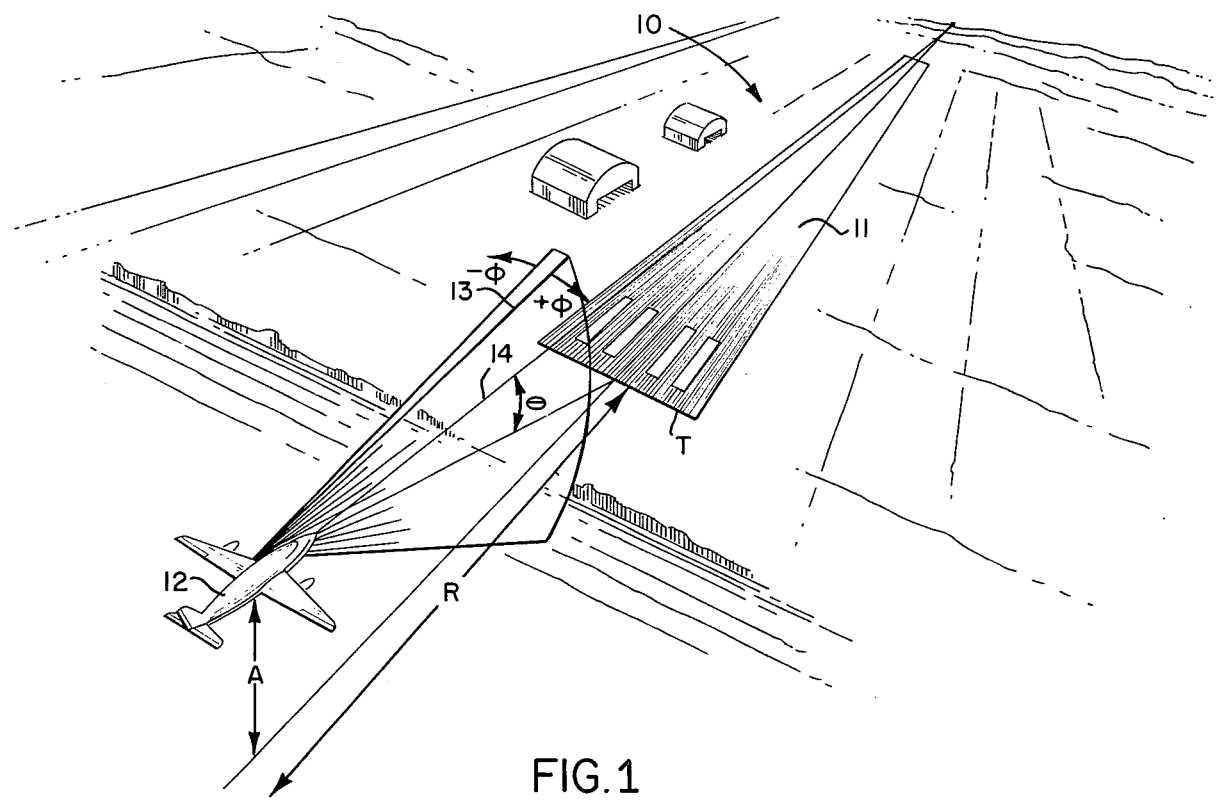
FIG. 1 is a perspective view of an airport complex showing an aircraft incorporating the perspective radar system of the present invention approaching the airport runway for a landing.

Referring first to FIG. 1 there is designated generally by the numeral 10 an airport complex including a runway 11. An aircraft 12 is shown approaching the runway for a landing. This aircraft includes a perspective radar incorporating features of the present invention for augmenting the display.

As shown in FIG. 1, a suitable antenna means on the plane transmits radar pulses in the form of a fan-shaped beam 13 lying in a vertical plane. A straight horizontal line 14 in FIG. 1 extends to the horizon and from this line the depression angle of positions of targets depending upon the altitude A of the aircraft 12 is measured by the angle $\theta$. The fan-shaped beam itself is caused to scan back and forth in azimuth over an angle $\phi$ measured from the center position of the beam positively to the right and negatively to the left all as indicated.

Figure 2:
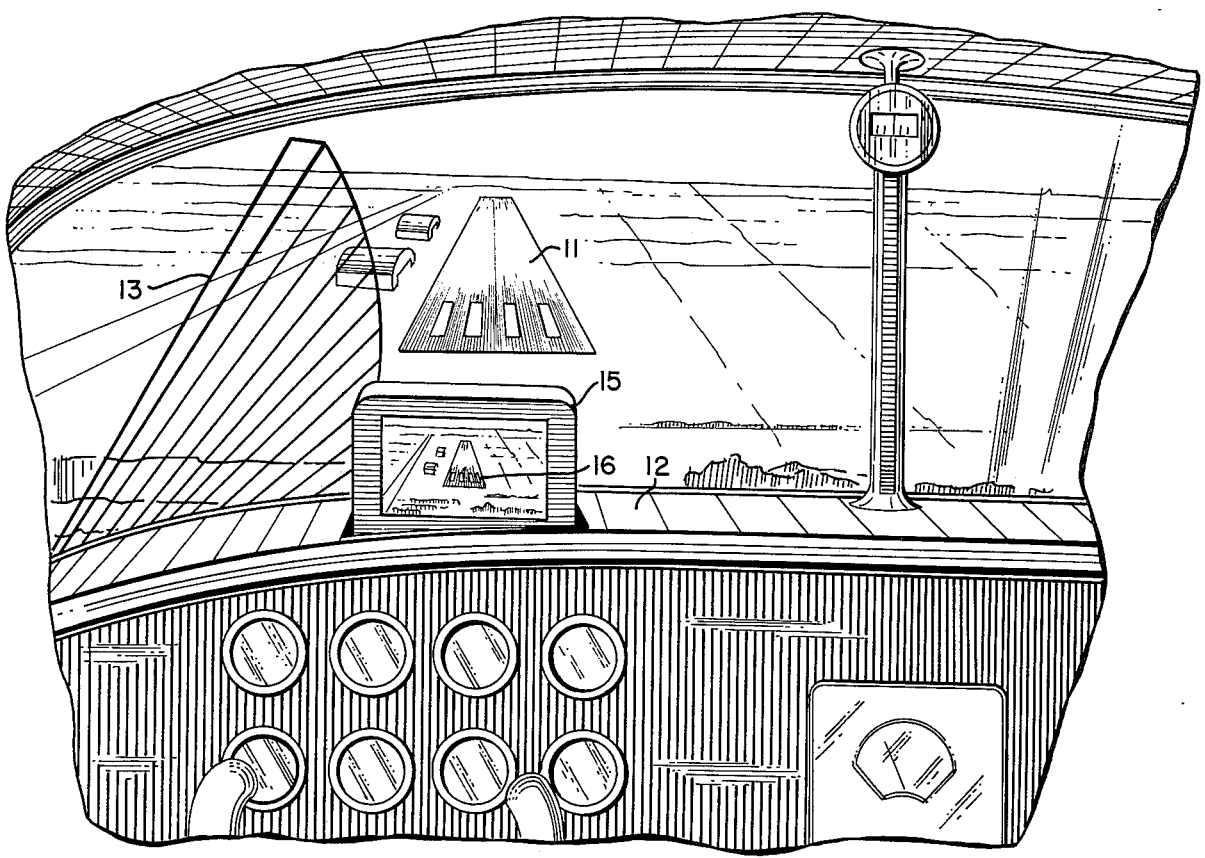
FIG. 2 is a view looking out at the airport complex from the interior cockpit of the aircraft of FIG. 1 showing the perspective display.

Referring to FIG. 2, there is shown a suitable cathode ray tube or other display structure 15 wherein the returning radar signals generated a display 16 on the screen showing the airport complex in perspective precisely the same as the pilot views out of his windshield on a clear day.

Figure 3:
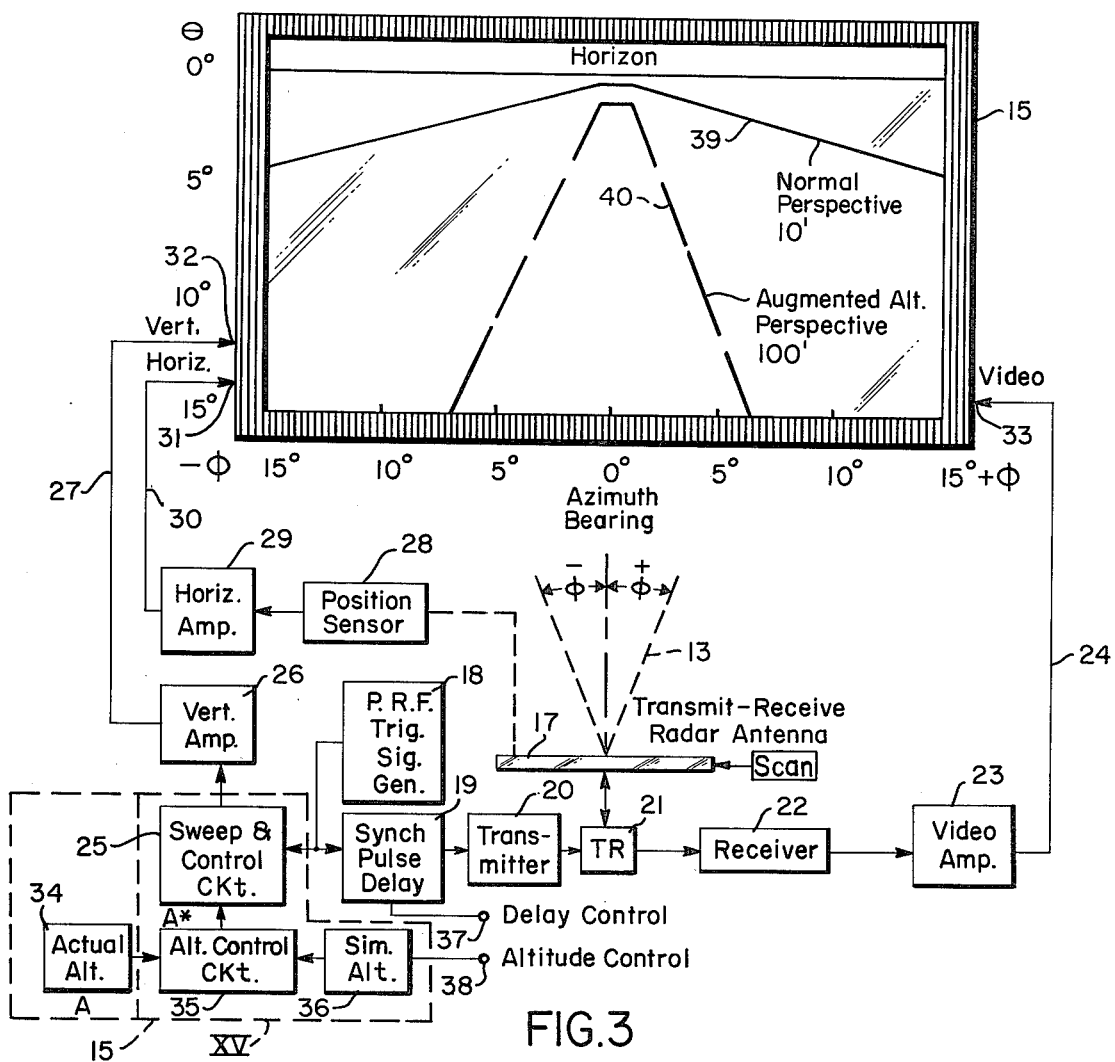
FIG. 3 illustrates a basic display of a perspective radar system in accord with the present invention together with major components of the system which may be incorporated in the aircraft of FIG. 1 or may be used in other vehicles such as ships.

Referring now to FIG. 3 the basic components making up the perspective radar described in conjunction with FIGS. 1 and 2 are shown. Thus in the lower central portion of the drawing there is depicted by the elongated rectangle the radar antenna 17 providing the beam 13. As stated, the beam 13 is caused to a scan in azimuth through positive and negative angles $\phi$ which may cover a total range of 30°. The frequency of scanning may be of the order of 50 scans per second. The means for moving or scanning the beam may comprise a ridge scan activated by the "scan" block as explained, for example, in my U.S. Pat. No. 3,829,862 entitled "Ridge Scan Antenna".

A radar pulse repetition frequency trigger signal generator 18 is shown to the left of the antenna 17 connecting through a synchronizing pulse delay circuit 19 which will be described in detail subsequently. From the delay circuit 19, the synchronizing P.R.F. pulse triggers transmitter 20 which through the normal TR box 21 and the antenna 17 will transmit the fan-shaped beam at the pulse repetition frequency. Echo signals from targets intercepting the beam, which signals are normally delayed in time in proportion to their range, are received on the same antenna 17 and from the TR box 21 passed to a receiver 22. These echo signals pass through video amplifier 23 to output line 24.

The pulse repetition frequency signal generator 18 also synchronizes a sweep and control circuit means designated by the box 25, this circuit generating an increasing sweep wave form voltage function at a frequency corresponding to the pulse repetition frequency. This function is amplified by vertical amplifier 26 and passed to output line 27.

Shown to the right and above the vertical amplifier 26 is a position sensor circuit 28 responsive to the sweep angle of an antenna beam 13. This position sensor provides a horizontal control signal through a horizontal amplifier 29 to an output line 30.

The display cathode ray tube or equivalent display means 15 includes a horizontal input 31 connecting to the output line 30, a vertical input 32 connecting to the line 27 and a video input 33 shown to the right connecting to the line 24. Thus, the electron beam in the display structure 15 is moved horizontally back and forth across the screen in precise synchronism with the movement of the fan-shaped radar beam 13 by the signal generated from the position sensor 28, passed through the horizontal amplifier 29 to the horizontal input 31. The same electron beam in turn is also caused to sweep from the bottom to the top of the screen at a rate controlled by the sweep wave form voltage function received in the vertical input 32 from the output line 27. The frequency of the vertical sweep which corresponds to the pulse repetition frequency is many magnitudes higher than the horizontal movement of the antenna beam and cathode ray beam caused by the horizontal input so that essentially the entire screen area is rapidly scanned by the cathode ray beam of the display.

The radar echo signals in the form of video signals on the line 24 modulate the beam in such a manner that the brightness of the screen fluorescence increases in proportion to the strength of the video signal so that the various targets are displayed on the screen.

In order to render the display in perspective, and in accord with the teachings of my prior mentioned U.S. patent and pending application, an altitude signal is fed into the sweep and control circuit 25, this altitude signal being provided by the box 34 and constituting a measure of the actual altitude of the aircraft or in the event the system is used on another type vehicle, the actual altitude of the antenna above the ground. It is evident that a perspective picture will vary with the altitude and thus by feeding this altitude function to the sweep and control circuit 25, the position of targets on the screen will be varied.

As will be described in greater detail subsequently, and as already described in my heretofore referred-to patent and patent application, the actual altitude is first received in an altitude control circuit means shown at 35 which connects to the sweep and control circuit means 25 and shapes the sweep wave form voltage function such that the resulting display constitutes a perspective display. This function constitutes a hyperbolic function; that is, the sweep in a vertical direction changes with time in the form of a hyperbolic function, the specific shape of the function being determined by the actual altitude.

The entire circuit of FIG. 3 described thus far with the exception of the provision of the pulse delay circuit 19, provides a true perspective radar display, all automatically and synchronized with the actual altitude of the antenna above the ground so that the perspective picture will always appear regardless of the altitude of the observer, the same as the observer would view on a clear day looking in the same direction as the antenna beam.

In accord with the present invention, an augmented dislay may be provided the advantages of which will become readily apparent. Towards this end, there is provided an additional control circuit means which may constitute the pulse delay circuit 19 inserted between the P,R,F, generator 18 and transmitter 20, or a simulated altitude generating means shown by the block 36 connecting into the altitude control circuit 35, or a combination of both of these circuits. In the preferred embodiment as shown in FIG. 3, both a pulse delay circuit 19 and simulated altitude generating circuit 36 are shown and each is adapted to be manually controlled as by knobs 37 and 38.

Essentially, by manual manipulation of these control circuits, the perspective display provided in the display structure 15 can be made to appear the same as would appear if the obsrver and radar antenna were at a physical location different from their actual position. As an example, and still referring to FIG. 3, there is shown at 39 the right and left sides of the runway 11 described in FIG. 1 and displayed at 16 in FIG. 2 as would appear from the normal perspective radar when the aircraft 12 has approached to almost landing condition such as at an altitude of 10 feet. Also shown in the display by the dashed phantom lines 40 is an augmented view of the runway as it would appear if the aircraft were at an altitude of for example 100 feet corresonding to that illustrated in FIGS. 1 and 2 after passing the runway threshold.

Clearly there are certain advantages to the pilot landing the aircraft if he could view the entire runway from a relatively low altitude the same as though it would appear if he were at a higher altitude since lateral alignment of the aircraft relative to the runway edges is enhanced at a higher altitude. This situation can readily be created by means of the simulated altitude generator 36 described in FIG. 3 under manual control by the knob 38. Thus, the pilot will set in an arbitrary altitude which in turn is passed to the altitude control circuit 35 to modify the sweep wave form voltage function to correspond to that which would be generated at a different altitude corresponding to the selected altitude by the knob 38. As a consequence, the perspective display at the augmented altitude appears the same as though the observer and radar antenna were physically positioned at the selected altitude; in the example give, 100 feet.

Figure 4:
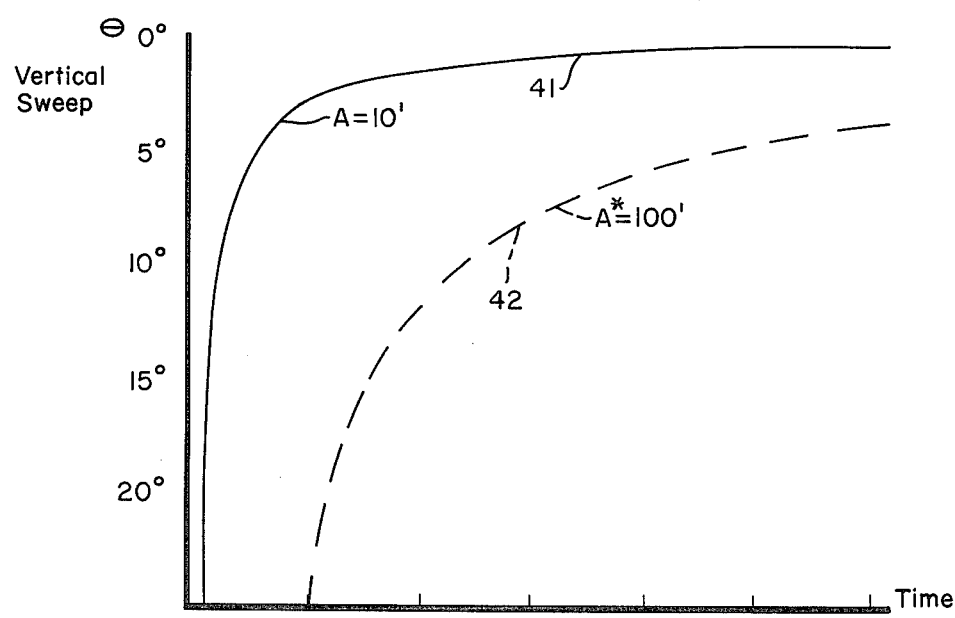
FIG. 4 illustrates the generated sweep wave form voltage function for two different altitudes applied to the display of FIG. 3.

FIG. 4 illustrates at 41 the sweep wave form voltage function generated to provide a perspective view where the altitude A is 10 feet and in the example given in FIG. 3, this function would reproduce the perspective picture of the runway indicated at 39. The modified sweep wave form voltage function is shown by the dashed line 42 and is the same as that which would be generated if the aircraft were actually at the augmented altitude A* of 100 feet.

It will be appreciated that by enabling the pilot to observe substantially the entire runway as would appear at a 100 foot altitude while he is actually at a 10 foot altitude is very useful. For example, the far end of the runway as shown in FIG. 3 is displayed downwardly from the horizon and objects at this far end are more readily detectable. Further, the lateral position of the aircraft relative to the runway edges is considerably enhanced.

The foregoing represents one example of the use of the additional control means for augmenting the altitude of the display. As will become clearer as the description proceeds, the altitude can not only be augmented to increase but can be augmented in the reverse direction so that when an aircraft is flying at a relatively high altitude, the perspective radar display will provide a perspective picture which would correspond to that generated if the aircraft were at a substantially lower altitude.

Figure 5:
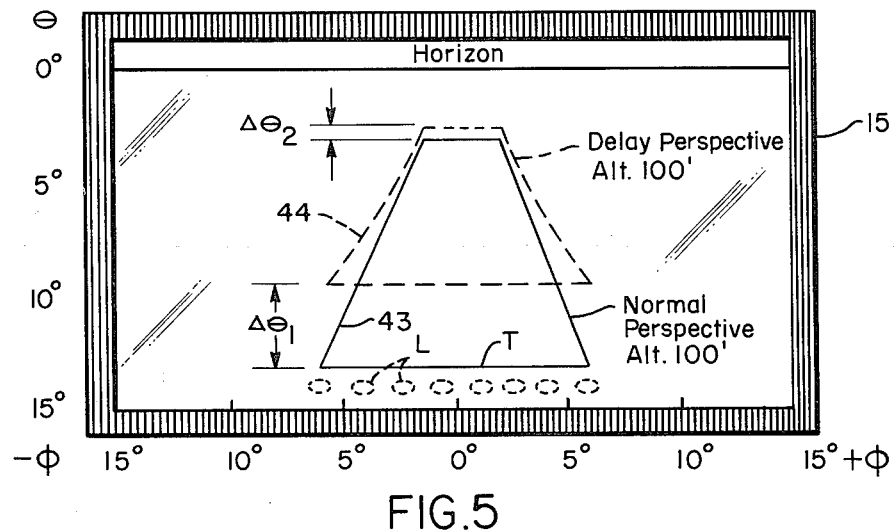
FIG. 5 illustrates a perspective display and an augmented display in dashed lines.
Figure 6:
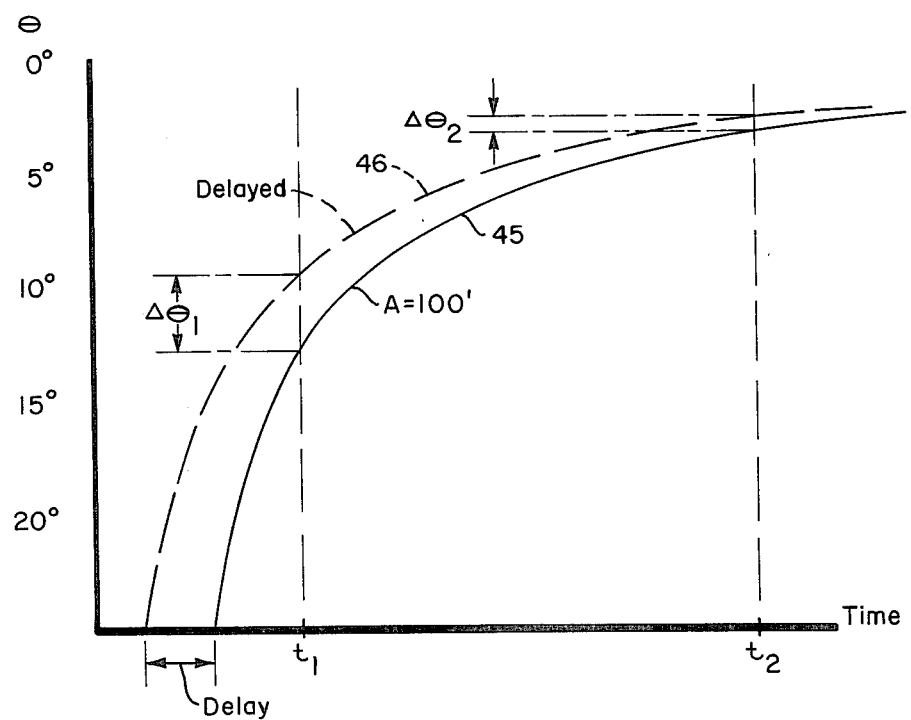
FIG. 6 shows sweep wave form voltage functions providing the display of FIG. 5.

Referring now to FIGS. 5 and 6, there is shown an example wherein the additional control means modifying the sweep wave form voltage function comprises the pulse delay circuit 19 described in FIG. 3. Essentially, a given selected delay may be set into the pulse delay circuit 19 as by the knob 37 to delay in time the pulse repetition frequency signals triggering the transmitter relative to the time of initiation of the sweep wave form voltage function so that targets appear to be at a further range on the display than would be the case in the absence of a delay substantially the same as though the observer and radar antenna were physically positioned at a greater range from the targets. As a consequence, close in targets appear on the display.

For example, the display structure 15 in FIG. 5 shows a runway 43 in solid lines corresponding to the normal perspective picture similar to that illustrated in FIG. 2. If now the delay is introduced in the circuit of FIG. 3, the display is augmented so that the runway appears as in the dashed lines 44. It is the same as though the entire radar and observer were moved away from the runway to a greater range. As indicated in FIG. 5, certain close in targets such as indicated by the phantom circles L which might be runway threshold lights come into view which were not visible with the normal perspective radar.

FIG. 6 illustrates the sweep wave form voltage function at 45 providing the normal perspective display at an altitude of 100 feet at a given range. When the delay is introduced, the relative time of initiation of the sweep wave form voltage function to the transmitted radar pulse is such that in effect the sweep wave form voltage function is as illustrated by the dashed line 46. The apparent change in range will be evident from a comparison of FIGS. 5 and 6 together wherein there is introduced the increased ranges at the near end of the runway designated by $\Delta \theta_1$ and at the far end of the runway by $\Delta \theta_2$.

Thus the display is augmented but in this instance in a horizontal direction as opposed to the augmented altitude or vertical direction described in conjunction with FIGS. 3 and 4.

It will be noted in FIG. 5 that the sides of the runway in the augmented display curve slightly. This curving is a consequence of a slight non-linearity that is introduced when the delay technique is used but as will become clearer throughout this description, this non-linearity is of no serious consequence.

It will be understood, of course, and as depicted in the block diagram of FIG. 3 that both controls for augmented altitude and augmented range are preferably utilized in the preferred embodiment of the invention so that an observer can effectively view the display screen as it would appear if he were moved in altitude, range or both.

From the foregoing, it will be seen that the best of two worlds for very close in work during poor visility conditions is provided by combining the augmented range perspective, even though slightly non-linear, with the altitude augmented perspective. As an example, raising the actual altitude from 10 feet to an augmented altitude of 100 feet and also initiating the vertical sweep of a 15° elevation perspective display at zero range instead of the usual range of 100 feet times 57.3/15° which is 382 feet not only provides for better separation detection of objects at the far end of the runway but renders visible foreground objects up to zero range.

The use of the display in the foregoing manner is a little like trying to walk upstairs the first time with a new pair of bifocals or fish eye lens. There will be some non-linearity of the perspective at close ranges (which occurs at high depression angles), but on the other hand, targets from zero to 382 feet will be seen that were not possible to see. Furthermore, the upper portion of the display will not have a non-linear perspective but will have a true linear perspective display. This region of the display is linear because the range to the targets in the upper portions of the display are large with respect to the initial pre-set vertical sweep range of 382 feet.

The foregoing mode of operation is ideal for those instances where the pilot wishes to follow closely to another aircraft during taxi, or in the case the radar is on a boat or ship, the captain wishes to bring the ship to a stop close to a buoy for mooring or perhaps docking during poor visibility conditions.

Any distortion of the perspective display in the example is substantially less than the more common B-scope which is a display of linear range with linear azimuth angle. Neither vertical arrays of targets nor horizontal arrays of targets are distorted when viewed on the B-scope but parallel linear arrays of targets on the ground plane do not intersect linearly at great range (that is, at the horizon) but tend toward intersect with curved lines at great range. In fact, a straight line array of targets on the ground plane which would exhibit the most distortion on the PPI and perspective display would be a line of targets arranged parallel to one edge of the azimuth beam scan. This would be an array of targets similar to a taxi way edge or boat dock.

Figure 7:
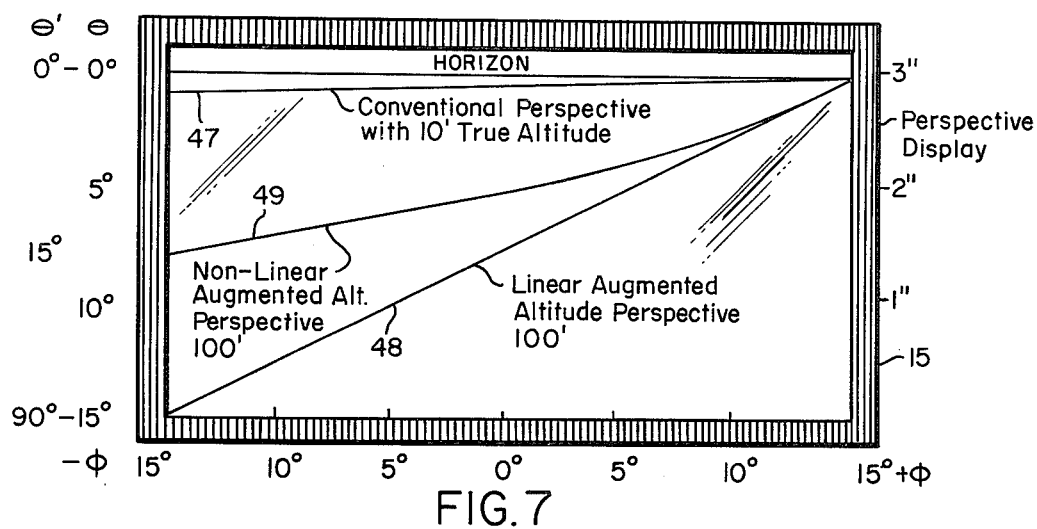
FIG. 7 shows three perspective radar displays of a line target in accord with the present invention.
Figure 8:
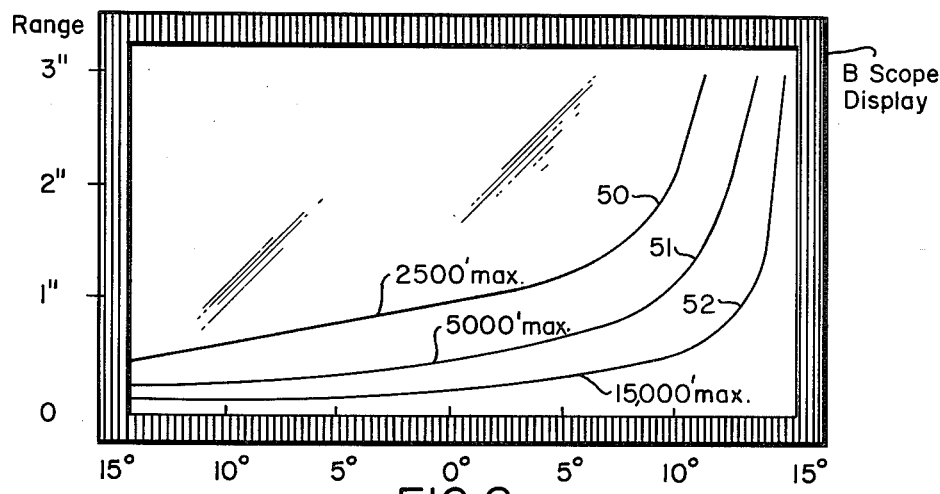
FIG. 8 shows the identical line target of FIG. 7 on a typical B scope type radar for comparison with that of FIG. 7.
Figure 9:
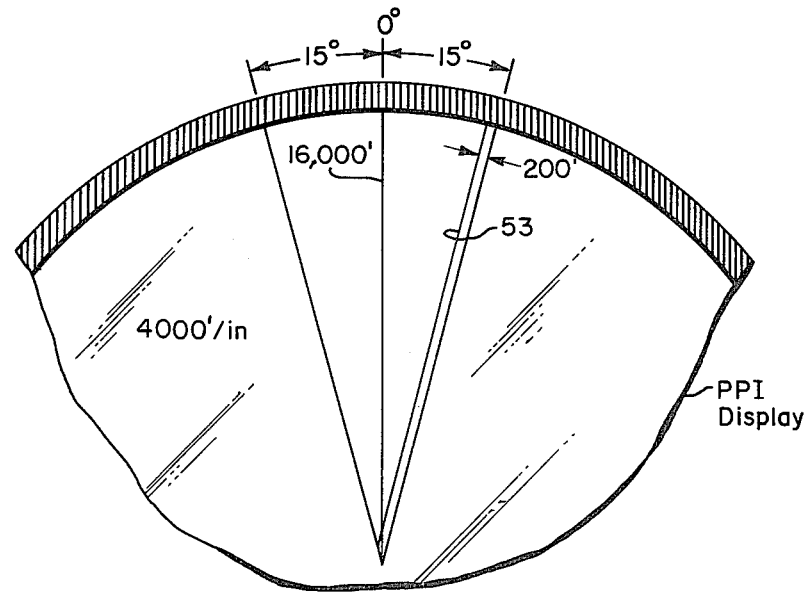
FIG. 9 is a fragmentary view of a PPI display of the identical line target for comparison with the displays of FIGS. 7 and 8.

All of the foregoing will be better understood by referring now to FIGS. 7, 8 and 9 which illustrate a comparison of applicant's augmented perspective radar display with a conventional perspective display, a conventional B-scope display and a conventional PPI display.

Considering first the display of the present invention as depicted in FIG. 7, assume the extreme condition of a series of corner radar reflectors positioned on the ground in a straight line and spaced sufficiently close that the corner reflectors produce a line on the display. This line is specifically directed to be parallel to the right edge of the azimuth scan and intersect the left edge of the azimuth scan at about a 400 foot slant range from the radar antenna.

The line formed by the corner reflectors is seen on the perspective display of applicant's invention shown in FIG. 7 at 47 when the conventional perspective display is utilized with a 10 foot true altitude, 48 with a linear augmented altitude at 100 feet, and at 49 for the non-linear augmented altitude perspective at 100 feet wherein the range position is effectively shifted. With respect to the curve 49, a different scale is utilized as shown to the left wherein a 90° depression angle obtains so that targets down to almost zero range will be displayed.

The same line formed by the corner reflectors, FIG. 8, is seen on the B-scope at 50, 51 and 52, corresponding to maximum ranges (full scale) of 2500, 5,000 and 15,000 feet.

On the conventional PPI display, FIG. 9, at a scale of .1 inch equal 400 feet, the line is illustrated at 53.

The B-scope as shown in FIG. 8 will display zero range but distortion of the line is great at the 15,000 foot maximum range and when this maximum range is reduced to reduce the distortion, less of the length of the line is shown; that is fewer of the corner reflectors can be seen on the display.

For very close in operation, the best results are obtained with the combination of the altitude augmented perspective and range augmented perspective radar display of FIG. 7. This display provides a more expanded view of the series of corner reflectors than either the B-scope or PPI display while retaining the features of displaying zero range and yet presenting essentially infinite range.

The foregoing display of FIG. 7 also provides a more expanded view than a true view of the conventional perspective with ten feet of actual altitude. Further, when the augmented range is utilized the resulting line compared with the linear augmented altitude or the conventional perspective has the advantage of displaying zero range at the slight expense of exhibiting a line which is curved in the lower portion of the display. Of course, an alternative to the example given would be to reduce the distortion of the combination display but not displaying zero range but a range minimum of, for example, 200 feet, which is half the minimum range the 100 foot augmented altitude display can present.

The pulse delay circuit 19 referred to in FIG. 3 may comprise standard integrated circuits used in a standard method of pulse time delay. The delay of the triggering of the transmitter radar pulses allows the vertical sweep wave form voltage function to begin earlier than normal. In the example, a delay equivalent to 382 feet (about .764 microseconds) would provide the opportunity to display targets at essentially zero range.

All of the foregoing discussion thus far can better be appreciated by once again reviewing the basic concepts involved in perspective radar utilized in the present invention.

Figure 10:
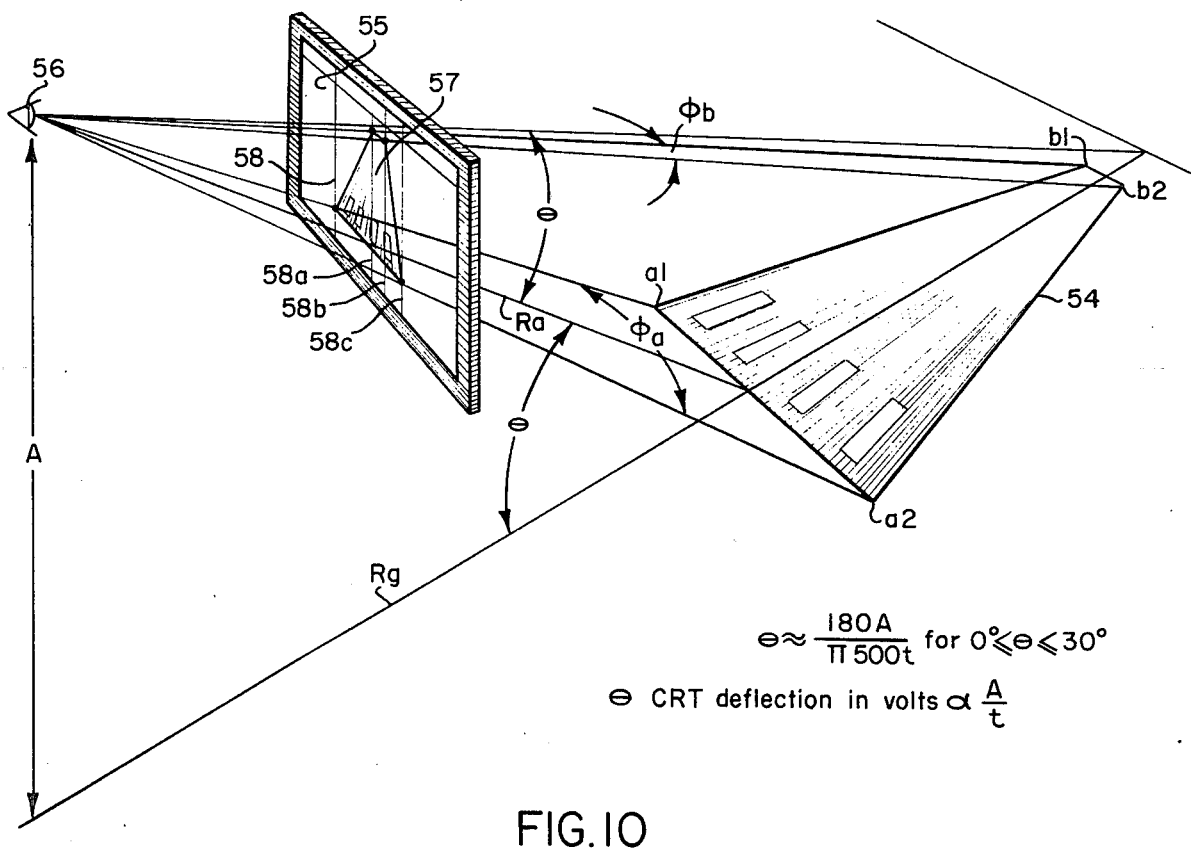
FIG. 10 is a diagrammatic schematic view of an airport runway for which a perspective display is provided useful in explaining basic theories in accord with the present invention.

For this purpose, reference is had to the schematic showing of FIG. 10 wherein a runway 54 is shown with near left and right corners a1 and a2 and far corners b1 and b2. At 55 is shown a transparent screen lying in a vertical plane wherein the perspective image of the runway 54 as visually viewed by an observer's eye 56 at an altitude A and a range $R_a$ is shown at 57. Thus, from an optical standpoint, it will be understood that the sides of the runway in the view on the plane 55 when extended upwardly will intersect at the horizon, thus providing a true linear perspective picture.

It is precisely this true optical picture as would appear on a screen 55 that the perspective display under normal perspective operation provides. Thus, considering the provision of a fan-shaped radar beam which moves in azimuth through the angles $\phi a$ to sweep across the near end of the runway and thus pick up echo radar signals from the corners a1 and a2 and at a slightly later period of time when sweeping through the angle $\phi b$ picking up echo signals from the corners b1 and b2 at the far end of the runway, these echo signals in the form of video signals on the display would provide the four corners of the runway on the radar screen in precisely the same positions as illustrated by the optical image 57 on the screen 55. In other words, the conventional perspective radar image of the runway is coincident with the pilot's visual image; that is, the visual image has a one-to-one aspect ratio with the radar image which is made visible by the cathode ray tube display or equivalent device.

The generation of the targets displayed on the radar screen result from the return echo signals utilized to turn on the cathode ray tube spot which is being deflected vertically and written as an essentially invisible vertical raster line until the spot is turned on. The spot is turned on and made visible to coincide geometrically with the line of sight and the time it takes for the radar pulse to travel from the antenna to, for example, the corner of the runway and return to the antenna. Essentially, the perspective concept is to turn on the spot on the cathode ray tube coincident with the line on the screen 55 defining the runway 57 in FIG. 10. Such will occur if the vertical deflection of the cathode ray tube spot is proportional to a constant divided by time. As stated, this sweep wave form voltage function for the vertical sweep of the cathode ray tube beam is a hyperbolic function and results in the depicted vertical sweep line 58 containing one turned on spot coincident with the intersection of the line of sight from eye 56 to a1 with screen 55. Similarly a spot on lines 58a, 58b, 58c completes the outline of the runway. These lines are distinguished laterally by the azimuth scan angle of the antenna.

Utilizing the term $\theta$ as the depression angle, the following relationships exist as shown in FIG. 10:

$$\theta \approx \frac{180 A}{\pi 500 t} \text{ for } 0 \leq \theta \leq 30$$

$\theta$ is the CRT deflection in volts and is proportional to $A/t$.

It will be recalled referring back to FIG. 3 that there is shown the augmented display in dashed lines 40 of the runway from the actual normal perspective display 39 as would occur at a 10 foot altitude. The cathode ray sweep wave form voltage function defined by the foregoing equations for the conventional perspective and illustrated in FIG. 4 by the solid line 41 is modified to that illustrated at 42 by the simulated altitude control circuit 36 described in FIG. 3 where an augmented altitude A* = 100 feet. It will be seen that the sweep wave form is less "acute" that is, the initial speed of the sweep at the initiation of the curve is less since the slope is less at the augmented altitude. Thus, in all cases where the augmented altitude is greater than the actual altitude the hyperbolic sweep deflection circuitry would require less band width. Further, it becomes practical to increase the view angle (that is, the maximum depression angle $\theta$) of the perspective. This increase in view angle is essentially proportional to the square root of the ratio of the augmented altitude to the actual altitude; that is $\sqrt{A^*/A}$.

The specific advantage of providing the augmented altitude such as described in FIG. 3 will now be evident by considering the following situation. Assume a runway is one nautical mile long, the near end beginning at a range of 3 nautical miles from an approaching aircraft and ending at 4 nautical miles from the aircraft.

Assume the aircraft is on an instrument landing system approach of three degrees relative to the near end of the runway, a distance of three nautical miles. The pilot turns on his conventional perspective radar. He is now at an altitude for example of 954 feet. The far end of the runway will appear at 2.25°. If the height of the display is 3 inches and the viewing field of the display is 15°, the runway near edge will be .6 inches from the top and the far edge of the runway will be .45 inches from the top. The runway length will be very small for example, .15 inches long.

By now multiplying the actual altitude by a factor of 3, that is, utilizing an augmented altitude by means of the simulated altitude control circuit 36 approximating 2800 feet, the runway will be 3 times as long as seen on the display (.45 inches long) and will appear at 3 times the normal depression angle (the close end of the runway will appear at 9° and the far end will appear at 6.75°). Under these conditions, even cross runways will be visible. Thus, airport recognition has been enormously enhanced by utilizing the augmented altitude perspective wherein the display shows the appearance of the runway in perspective as it would appear at a substantially higher altitude than the actual altitude.

It should also be understood, however, that the augmented altitude A* can be made substantially less than the actual altitude of the aircraft and such an augmentation to a lower altitude will have advantages in aiding the pilot to observe way points.

Figure 11:
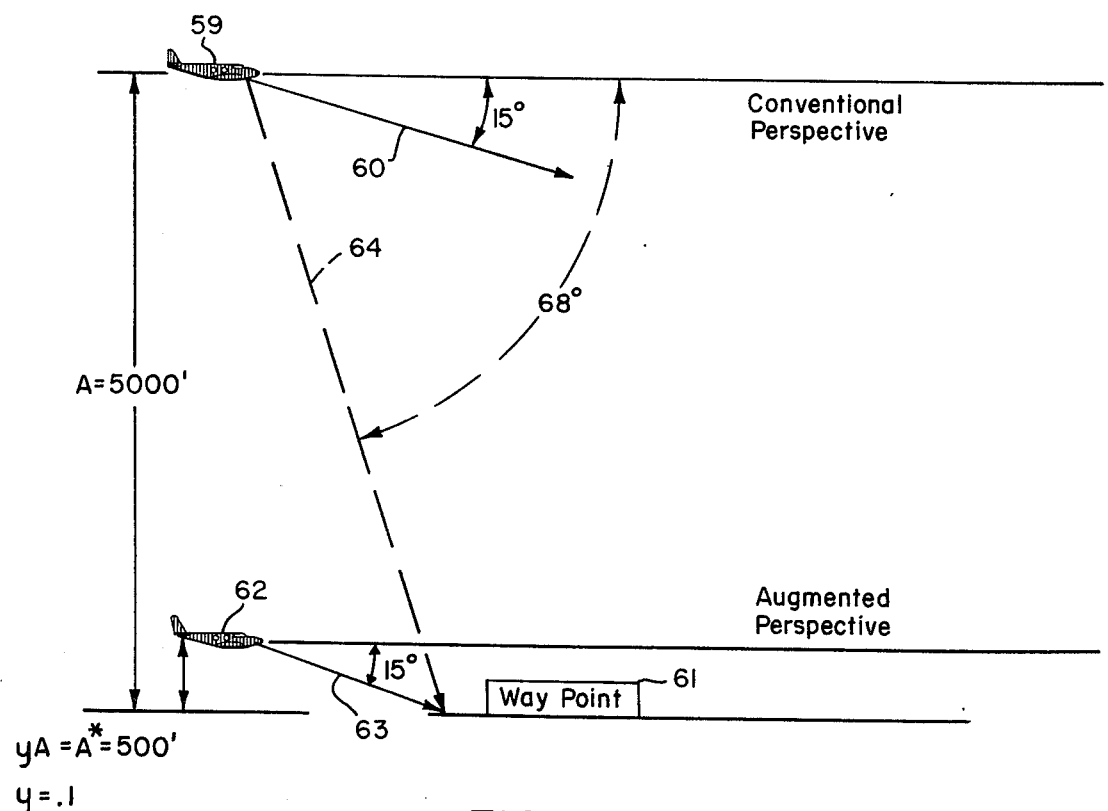
FIG. 11 is a diagrammatic showing of an aircraft in flight in an actual and simulated position useful in explaining advantages of one type of augmented perspective radar in accord with the invention.

Referring to FIG. 11 there is illustrated schematically an example of utilizing an augmented altitude which is substantially less than the actual altitude of the aircraft. Thus there is shown an aircraft at 59 at an actual altitude of 5000 feet. The elevation beam width of the fan shaped beam (13 of FIG. 1) is sufficient to illuminate the waypoint 61 in FIG. 11 and to receive the microwave energy reflected back toward the aircraft 59 from waypoint 61. Thus, the radar has in its receiver/transmitter unit, as a function of time, the radar return from the waypoint. However, with a conventional perspective display having a maximum 15° depression angle, aircraft 59 would have a display whose closest radar returns (shown at the bottom of the display) would be three nautical miles away. The return from the waypoint would be at much closer range (a little less than one nautical mile) and would not be displayed on a conventional perspective display but by augmenting the altitude to 500 feet (while utilizing the same deflection circuitry and the same 15° depression angle), the closest terrain displayed will be .32 nautical miles in front of the aircraft when measured along the ground from directly underneath the aircraft. A way point such as 61 would thus not appear on the radar screen when the normal perspective is used but in the augmented case wherein the different apparent position of the aircraft would be as indicated at 62 at an augmented altitude of 500 feet, it will be evident that the 15° depression angle indicated by the arrows 63 will intercept the way point.

Essentially, the technique has increased the conventional display coverage from 15° to 68° as indicated by the dashed line 64. Thus both elevational coverage and azimuth resolution are enhanced. The azimuth resolution is improved by a three-to-one factor, which follows because of the actual reduction in slant range from three nautical miles to one nautical mile. This arrangement would be practical for tracking a river, for example, while flying at a high altitude.

In both cases where the altitude is augmented to either a higher value or a lower value, the augmentation is accomplished by multiplying the actual altitude by a variable parameter such as y as in FIG. 11. Thus where y is greater than 1, the altitude is augmented to a higher altitude and where y is less than the actual altitude the augmented altitude is lower.

As a practical matter in connection with the augmentation to a lower altitude as described in FIG. 11, antennas with broad elevation beam widths are required. Further the simple hyperbolic function generator is only sufficiently accurate when using augmented altitudes unless the depression angle is about 30° or less which dictates that ground range and slant range are essentially equal; that is, the tangent and sine of the depression angle are substantially the same for angles 30° and less. Because of the effective depression angle of 68° as described in FIG. 11, the vertical sweep wave form voltage function must be modified to prevent unnecessary distortion.

Figure 12:
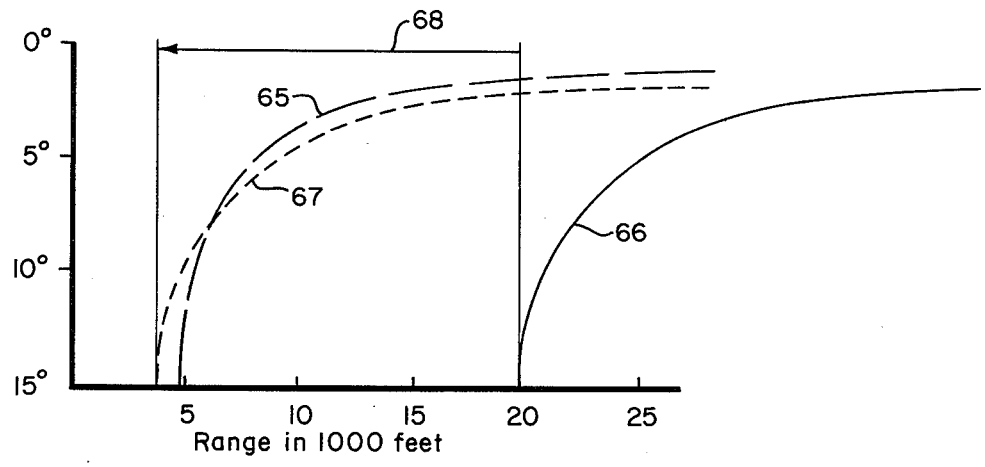
FIG. 12 illustates further sweep wave form voltage functions utilized with the system of FIG. 11.

Referring to FIG. 12, for the conditions indicated in FIG. 11, there is shown a plot by the dashed curve 65 of the depression angle θ as a function of range in thousands of feet. For convenience, let the vertical deflection of the cathode ray tube in inches or volts equal θ. The vertical sweep wave form voltage function generated is then given by:

$$\theta = \frac{180}{\pi} \frac{A^*}{A} \tan\left(\sin^{-1} \frac{A}{500t}\right)$$

where t is approximately the time in microseconds from the time the radar transmitter located in the aircraft fires the radar pulse. For angles of θ less than 30°, the foregoing equation reduces to the familiar hyperbolic function:

$$\theta = \frac{180 A^*}{\pi 500 t}$$

It is interesting to note in connection with FIG. 12 that the newly modified function shown by the dashed line 65 and as described above can be very closely generated by introducing a time delay of the generation of a normal hyperbolic perspective radar curve. For example, there is shown at 66 a normal perspective radar vertical deflection function which is delayed in time such that it appears at the short dashed line position 67, the delay being indicated at 68. It is to be noted that there is a fairly good matching with the desired curve 65. Thus, an adjustment of the pulse delay circuit all as described heretofore can accomplish a similar result as that described.

Considering once again FIG. 11, the waypoint 61 would appear as a pulse on the range coordinate of FIG. 12 at 5000 feet range. Thus the waypoint would not be displayed on a conventional perspective display with a conventional sweep 66 but would appear precisely at the required 15° depression angle of sweep 65.

Figure 13:
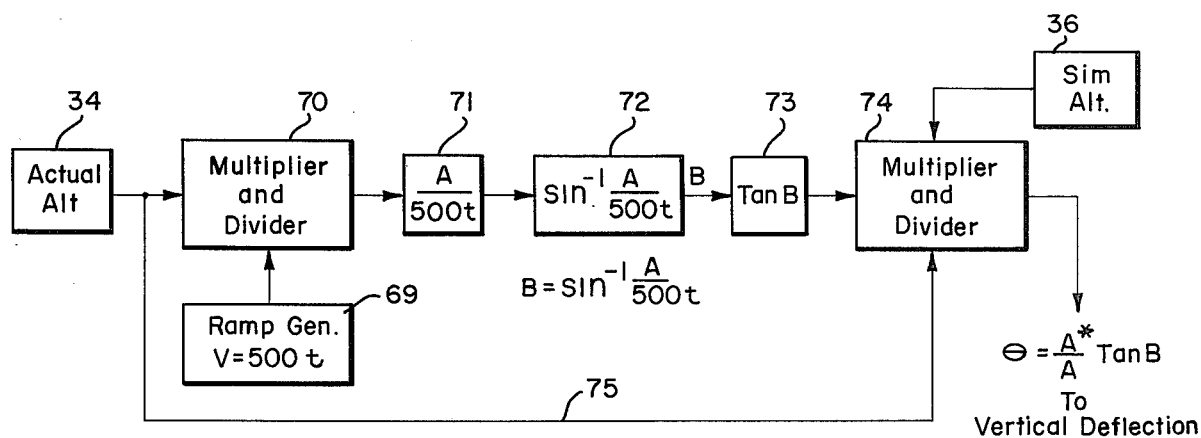
FIG. 13 is a block diagram of various components making up a sweep generator to provide a sweep wave form voltage function for the radar display as illustrated in FIG. 12.

FIG. 13 shows a block diagram for providing the specific function 65 of FIG. 12 wherein the actual altitude from the actual altitude generating circuit 34 of FIG. 3 is repeated in FIG. 13 at the left and the simulated altitude circuit 36 is shown to the right.

In the block diagram, a ramp generator 69 provides a voltage function of time which is passed with the actual altitude signal into a multiplier and divider 70. The function of the block 70 is to provide an output signal proportional to A/500t, as shown at 71. The arc sine of this function is taken by the block 72, the same being designated by the letter B. Block 73 provides a signal proportional to the tangent of B which in turn is fed to a multiplier divider circuit 74 receiving the simulated altitude from the circuit 36. This same circuit 74 also receives the actual altitude from circuit 34 by way of branch line 75. The final output voltage signal which is fed to the vertical deflection coils of the cathode ray tube is given by the equation:

$$\theta = \frac{A^*}{A} \tan B$$

The foregoing equation essentially describes the wave form 65 of FIG. 12.

Figure 14:
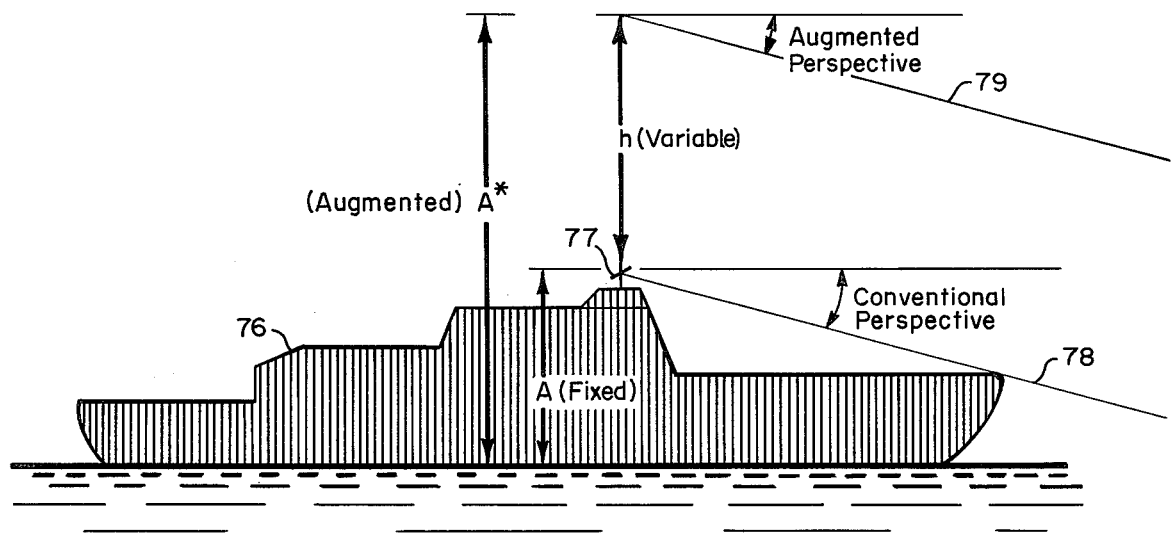
FIG. 14 is a side elevational view schematic in form of a ship or boat incorporating a perspective radar with augmented display in accord with the present invention.

Referring now to FIG. 14, there is shown a further example of the use of an augmented altitude perspective radar on a ship or boat. Thus there is indicated for a ship 76 a perspective radar antenna 77 which would normally be at a fixed altitude A above the surface of the water. For example, this fixed altitude might be 50 feet.

By utilizing an augmented altitude the perspective display can be made to appear as it would at the selected augmented altitude indicated at A*. The effective depression angle for the conventional perspective and augmented perspective from the antenna 77 is indicated at 78 and 79 respectively. Each depression angle is 15° as in the previous examples. The augmented altitude in the case of FIG. 14 is derived by adding to the fixed altitude the desired new altitude, this variable being indicated by the letter $h$.

The enormous advantage of augmented perspective radar on ships particularly with respect to sensitivity to lateral motion will be evident when compared to a conventional PPI scope normally provided on ships.

Consider, for example, the PPI scope of FIG. 9 and assume it is to display a single target which is on the vehicle center line at a range of 400 feet. The PPI is a 12 inch diameter of 360° azimuth PPI with a scale of 6 inches equal to 3,000 feet. Assume that the perspective radar display is four inches by 2 inches with a 30° by 15° field of view, such as shown in FIG. 3 but wherein the actual altitude is 50 feet and the augmented altitude is 100 feet.

The target will appear on the perspective display laterally centered and at a depression angle of 57.3 h/R where R is the range, which equals 14.3°. This 14.3° is a distance of 14/15 multiplied by 2 inches from the top of the display; that is, 1.8 inches.

The target will appear on the PPI along the center line of the display a distance from the origin of 400/3,000 multiplied by 6 inches; that is, .8 inches from the origin.

Assume now that the ship carrying the radar moves laterally 100 feet, keeping the target at the same range. Since the PPI scale is 6 inches equals 3,000 feet, the target will appear on the PPI .2 inches to the left of center line, having moved from its previous position only .2 inches.

On the perspective display, the target will have moved laterally through an angle whose tangent is given by 100 feet (lateral display) divided by 400 feet (range), which is equal to 14.0°.

Thus the 100 foot lateral movement produced a PPI display movement of .2 inches and a perspective display movement of 1.9 inches. At this range, the perspective display is ten times more sensitive to lateral motion than the PPI. Since the PPI scope size is 12 inches and the perspective scope is 4 inches, the improvement in sensitivity, including the scope size is: 1.9/0.2 multiplied by 12/4 which equals a 28.5 to one improvement.

Still considering the sample of the ship of FIG. 14 with its perspective radar, the sweep wave form voltage function is essentially given by: range in nautical miles is equal to altitude divided by the product 6076 sin $\theta$, where $\theta$ again is the depression angle in degrees. The angular motion of targets which are changing range is equal to the derivative of $\theta$ with respect to range, and this is directly proportional to altitude and inversely proportional to the square of the slant range to the target, and is given in terms of degrees per nautical mile.

The limit of normal visual acuity on a bright, low contrast day, described as bright and hazy is about 1/6 of a degree. The threshold of angular motion sensitivity also varies with brightness, but a reasonable average is about 1/6 degree per second.

If two surface effect ships were travelling toward each other, each at 90 knots, the closing speed would be .05 nautical miles per second. Since the motion cue threshold is 1/6 degree per second, the threshold can also be written 1/6 degree per .05 nautical miles, or simply 3.33 degrees per nautical mile for the situation of two approaching ships. If one of the approaching ships is considered to be the ship 76 of FIG. 14 and the captain were on the bridge which is at a fixed altitude of 50 feet, his view of the bow of the approaching ship breaking through the water on the conventional perspective radar would be that generated by the sweep wave form voltage function corresponding to an altitude of 50 feet. A ship at 3 miles will be seen at about 1/6 of a degree depression angle. However, on the day described, the detection of the ship would be doubtful, since on such a day the visual acuity limit would not permit the captain to distinguish the horizon from a line, much less a point 1/6 of a degree below the horizon. If the ship could be seen, the downward motion of the ship in elevation angle on the display could be computed from the heretofore described formula as .05 degrees per nautical mile, a value well below the temperal threshold of 3.33 degrees per second. Thus in using the conventional perspective, the display is essentially the same as that the captain would visually observe.

Consider now the same situation utilizing an augmented perspective altitude as described in FIG. 14. Conventional perspective dictates that a first ship at a closing speed of 180 knots, range 3 nautical miles, when viewed from the bridge at 50 feet elevation, cannot be distinguished from a second ship following one mile behind the first ship. elevation motion is also imperceptible. This is because the elevation angle between the two ships would be .03 degrees, which exceeds the acuity of the eye on such a low contrast day. However, it can be seen that if the altitude is augmented to 5,000 feet so that the value of $h$ in FIG. 14 would be 4,950 feet, the first ship at 3 nautical miles is detected at an elevation angle of 16°, and the second ship at 4 nautical miles detected at a 12° depression angle, a 4 degree difference.

The foregoing can be further clarified by considering the use of display 15 of FIG. 5 having a 15° elevational coverage to observe both the conventional and augmented perspective views of the approaching ships. The conventional view would contain two ships but the elevational displacement of the ships (.03°) would be so small relative to the total elevational displacement (15°) of the display, that the two ships would appear as one ship. However, in the augmented view, the two ships would have a relative elevational displacement of 4° which is approximately ¼ of the total viewing elevation displacement and as a result of this enhancement of resolution (125 to 1), the two ships are displayed as two widely separated targets. The elevation motion of the ship at 3 nautical miles on the augmented perspective view is 5.2 degrees per nautical mile which greatly exceeds the conventional view of motion and also exceeds the motion threshold of 3.33 degrees per nautical mile when the display size and distance from the viewer are such that the display subtends an angle equal to the displaced angle. In this example, the radar horizon is 8.7 nautical miles.

As a practical matter, the captain will vary the augmented altitude ($h$) using an $h$ of one when maneuvering within ranges of obstacles less than one half mile, and increasing h above one to desired heights up to thousands of feet for ranges to obstacles from one mile to 20 nautical miles.

Such a resultant augmented altitude perspective radar would detect a fleet of ships in a formation of orthagonal rows and columns as a group of targets in line whose lines would either intersect the horizon or be parallel to the horizon. It is to be understood that such is not a synthetic video display but an actual radar display without distortion. Thus again, the augmented altitude perspective has the advantage of conventional perspective over the PPI presentation without the disadvantages of the compressed display of targets near the true horizon which occurs with conventional perspective radar.

Figure 15:
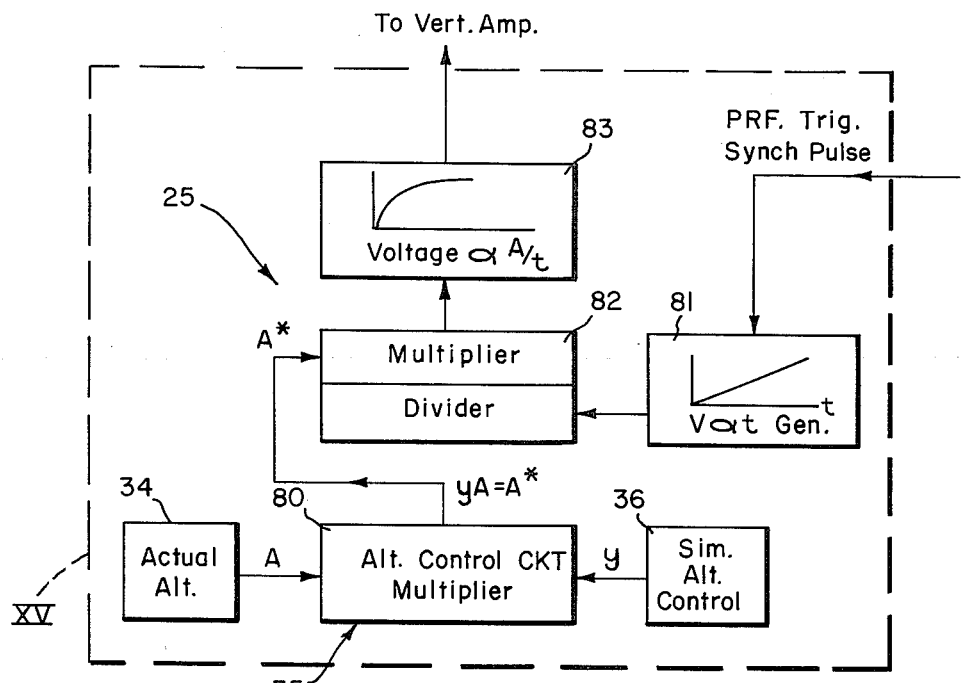
FIG. 15 is a more detailed block diagram of components incorporated in the dashed enclosure XV of FIG. 3.

Referring to FIG. 15, there is shown in more detail the circuits for providing the sweep wave form voltage function to the vertical amplifier of the display of FIG. 3 for cases where the actual altitude is multiplied by the parameter $y$ to provide the desired augmented altitude. Essentially, FIG. 15 shows the particular circuits which would be utilized in the dashed enclosure designated by the Roman numeral XV in FIG. 3.

The altitude control circuit 35 described in FIG. 3 takes the form of a multiplier 80 receiving the actual altitude A and the simulated altitude signal from the control 36 in the form of the parameter $y$. The output is the product $yA$ which is equal to the augmented altitude A*. A ramp voltage generator 81 synchronized to the P.R.F. trigger sync pulse passes to a divider portion of a multiplier divider 82 while the augmented altitude signal A* passes to the multiplier portion. The output from block 82 passes to sweep control circuit 83 and thence to the vertical amplifier for the display.

The foregoing circuit provides the modified sweep wave form voltage function in accord with the value of $y$ manually fed into the altitude control circuit 80.

In certain instances, for example, in landing aircraft, it might be desirable to have a given augmented altitude retained at a fixed value even though the actual altitude of the aircraft is varying during descent. As an example, and referring once again to FIGS. 3 and 4, as the aircraft approaches the runway from a high altitude to an altitude of 100 feet which would cause the display 40 to appear as shown, the pilot may wish to maintain this particular display as appers at 100 feet even though the aircraft is descending towards touchdown. Sensitivity of progress towards the runway is not impaired.

Figure 16:
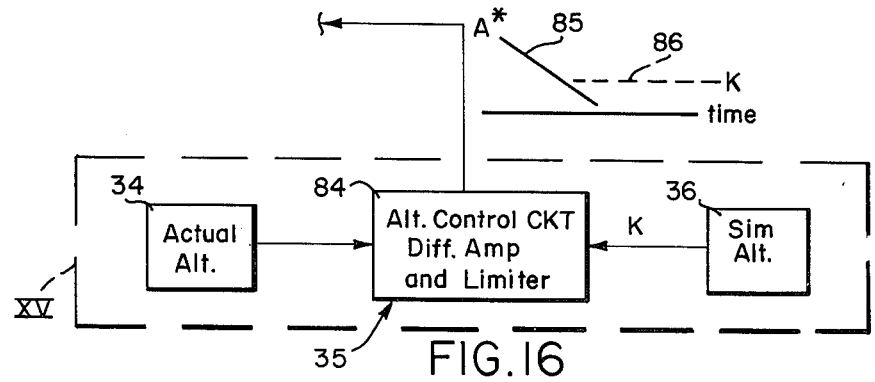
FIG. 16 is another block diagram of components which could included in the dashed enclosure XV of FIG. 3; and, FIG. 17 is still another block diagram of components which could be included in the dashed enclosure XV of FIG. 3.

Such an arrangement may be automatically provided by the circuit of FIG. 16 which could be used in the enclosure XV of FIG. 3. In FIG. 16, the altitude control circuit takes the form of a differential amplifier and limiter receiving the actual altitude from the circuit 34 and a selected simulated altitude from the circuit 36. In this case, a constant simulated altitude signal is selected and is represented by the letter K. The output from the differential amplifier and limiter circuit making up the altitude control circuit 84 is illustrated graphically at 85 wherein the augmented altitude A* passed to the sweep and control circuit means follows the actual altitude of the aircraft along the solid line 85 to the given fixed constant altitude determined by the selected constant K in the form of a bias signal to the differential amplifier and thence remains at this level as indicated by the dashed line 86.

Figure 17:
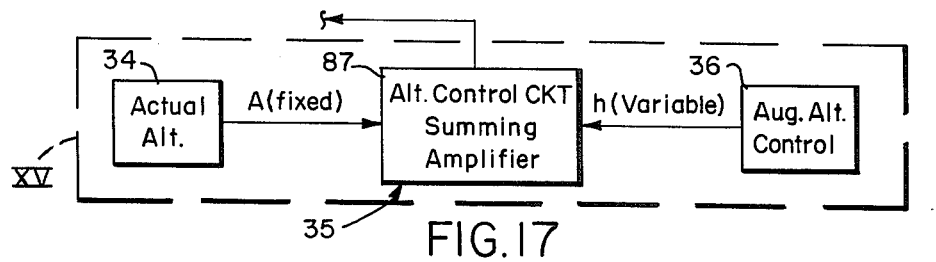

FIG. 17 shows the altitude control circuit utilized in the case of a ship wherein the augmented altitude is provided by simply adding a variable height $h$. Thus as shown in FIG. 17, the altitude control circuit takes the form of a summing amplifier 35 which receives the actual altitude from the circuit 34. In this case, the actual altitude is fixed by the given altitude of the antenna above the ocean and the augmented altitude to be provided by adding to the fixed altitude is given by the letter $h$. These two parameters are simply summed in the amplifier 87 and thence passed on to the sweep and control circuits.

In the case of the circuit of FIG. 15 wherein the parameter $y$ is utilized as a multiplier, the value of $y$ may vary between $10^{-4}$ to $10^4$.

In the case of FIG. 16, the constant fixed altitude may, of course, be any selected value to provide a bias signal to the differential amplifier and cause the augmented signal to level out as described. As examples, this altitude could be 10 to 500 feet.

Finally, and as also mentioned heretofore, the parameter $h$ constituting the altitude to be added to the fixed altitude and thus provide the augmented altitude may vary from 0 feet to 5 or even 10,000 feet.

From all of the foregoing, it will be evident that the present invention has provided a unique method of providing an augmented display together with suitable circuitry components to realize the method. Thus, the overall perspective radar system is vastly improved by the present invention and its many applications extended to ships for practical purposes as well as aircraft.

As in the case of aircraft use, the entire radar system is self-contained within the aircraft and does not rely on any external system. The same situation obtains when used on ships.

What is claimed is:

1. A method of altering the display provided by a perspective radar system to provide a display in a perspective as would appear if the observer were at a different position from his actual position comprising modifying the sweep wave form voltage function applied to the vertical input of the display to correspond substantially to that which would be generated if the radar antenna were at said different position whereby the targets viewed on the display assume the positions they would if the observer were actually at said different position.

2. The method of claim 1, in which said different position is at a different altitude from the ground than the altitude at said actual position, the sweep wave form voltage function being modified to correspond to that type of sweep wave form voltage function which would be generated if the radar antenna were actually at said different altitude.

3. The method of claim 1, in which said different position is at a different horizontal range from the actual horizontal range of targets at said actual position, said sweep wave form voltage function being modified by changing the relative time between transmission of radar pulses and initiation of the sweep wave form voltage function, so that targets appear as they would if the radar antenna were actually at said different horizontal range.

4. The method of claim 2 including further modifying the sweep wave form voltage function by introducing a selected delay in the transmission of radar pulses from the system so that the sweep wave form voltage function is modified to effectively start sooner in time relative to returning echo signals and thereby correspond substantially to the sweep wave form voltage function that would be generated if the radar antenna were at a different horizontal range from targets than the actual horizontal range whereby the display can be altered to correspond to that which would occur at a new position different in altitude, range or both.

5. A method of altering the display provided by a perspective radar system to simulate a display in perspective as would appear if the radar system and observer were at a different position relative to their actual position, comprising the steps of:
   a. providing an additional manually controllable circuit in conjunction with the perspective radar system;
   b. manually varying said circuit in such a manner as to artificially modify the sweep wave form voltage function applied to the vertical input of the display to correspond substantially to that which would be generated if the radar system and observer were at said different position whereby the targets viewed on the display assume such positions as they would if the perspective radar system and observer were actually at said different position.

6. The method of claim 5, in which said different position is at a different altitude from the ground than the actual altitude and in which the step of manually varying said circuit includes varying the circuit to modify the sweep wave form voltage function to correspond to that type of sweep wave form voltage function which would be generated if the radar system and observer were actually at said different altitude.

7. The method of claim 5, in which said different position is at a different horizontal range from the actual horizontal range of the targets, and in which the step of manually varying said circuit includes varying the circuit to change the relative time between transmission of radar pulses and initiation of the sweep wave form voltage function to provide echo signals on the display corresponding to positions which would occur if the radar system and observer were actually at said different horizontal range.

8. The method of claim 6, in which there is provided an additional manually controllable circuit for introducing a selected delay in the transmission of radar pulses from said system so that said sweep wave form voltage function can be further modified to effectively start sooner in time and thereby correspond substantially to the sweep wave form voltage function which would be generated if the radar system and observer were at a different horizontal range from targets than the actual horizontal range whereby the display can be modified to correspond to that which would be viewed in a different position in altitude, range, or both.

9. An augmented perspective radar system comprising, in combination:
   a. antenna means for transmitting radar pulses in a fan-shaped beam lying in a vertical plane and including means for moving said beam in azimuth over a given azimuth angle;
   b. radar transmitter and receiver means connected to said antenna means for transmitting said beam at a given pulse repetition frequency and receiving echo signals from targets intercepting the beam, said echo signals being delayed in time in proportion to the ranges of the targets respectively;
   c. sweep and control circuit means responsive to said given pulse repetition rate for generating an increasing sweep wave form voltage function at a frequency corresponding to said pulse repetition frequency;
   d. display means having horizontal, vertical and video inputs, said horizontal input being controlled in accordance with the position of said beam in azimuth, said vertical input being connected to receive said sweep wave form voltage function and said video input being connected to receive video signals;
   e. actual altitude generating means for generating an actual altitude signal corresponding to the actual altitude of said antenna means above ground;
   f. altitude control circuit means connected to said sweep and control circuit means receiving said actual altitude signal to shape said sweep wave form voltage function such that the resulting display constitutes a perspective view; and,
   g. additional control means for modifying the sweep wave form voltage function to thereby provide a perspective display which would appear if the observer and radar antenna were at a physical location different from their actual position.

10. A system according to claim 9, in which said additional control means includes simulated altitude generating means for generating a simulated altitude signal representative of a desired selected altitude, manual control means connected to said simulated altitude control means for enabling manual changing of the simulated altitude signal that is selected, said simulated altitude generating means being connected to said altitude control circuit means such that the sweep wave form voltage function is modified to correspond to that which would be generated at a different altitude corresponding to the selected altitude thereby providing a perspective display at an augmented altitude which appears the same as though said observer and radar antenna were physically positioned at said augmented altitude.

11. A system according to claim 10, in which said manual control means includes means for making the augmented altitude greater than said actual altitude.

12. A system according to claim 10, in which said manual control means includes means for making the augmented altitude less than said actual altitude.

13. A system according to claim 9, in which said additional control means includes a pulse delay circuit means receiving the pulse repetition frequency signals; and manually controllable means for adjusting the delay circuit to effect desired delay of the time the pulse repetition frequency signals trigger the transmitter relative to the time of initiation of said sweep wave form voltage function so that targets appear to be at a further range on said display than would be the case in the absence of a delay substantially the same as though the observer and radar antenna were physically positioned at a greater range from said targets whereby close-in targets appear on said display.

14. A system according to claim 10, in which said additional control means further includes a pulse delay circuit means receiving the pulse repetition frequency signals; and manually controllable means for adjusting the delay circuit to effect a desired delay of the time the pulse repetition frequency signals trigger the transmitter relative to the time of initiation of said sweep wave form voltage function so that targets appear to be at a further range on said display than would be the case in the absence of a delay substantially the same as though the observer and radar antenna were physically positioned at a greater range from said targets whereby close-in targets appear on said display and whereby an observer can render on the display a perspective radar picture which is substantially the same as would appear if the observer and radar antenna assumed a different physical position in either altitude, range or both.

15. A system according to claim 12, in which said altitude control circuit means and said sweep and control circuit means generate a sweep wave form voltage function defined by the equation:

$$\theta = \frac{A^*}{A} \tan B$$

where $\theta$ is the depression angle of the sweep from the horizon on the display, A is the actual altitude, $A^*$ is the augmented altitude, B is the angle whose sine is defined by $A/500t$ where t is time.

16. A system according to claim 10, in which said perspective radar is incorporated in an aircraft and said actual altitude generating means is responsive to the actual altitude of said aircraft above the ground; and wherein said altitude control circuit comprises a multiplier circuit so that said actual altitude signal is multiplied by said simulated altitude signal to provide said augmented altitude signal to said sweep and control circuit means, said simulated altitude signal constituting the multiplier and having a value between $10^{-4}$ and $10^4$.

17. A system according to claim 10 in which said perspective radar is incorporated in an aircraft and said actual altitude generating means is responsive to the actual altitude of said aircraft above ground; and wherein said altitude control circuit comprises a differential amplifier and limiter, said simulated altitude generating means providing a selected constant bias signal such that the augmented altitude signal passed to the sweep and control circuit means follows the actual altitude of the aircraft to a given fixed altitude as determined by said selected bias signal so that the altitude displayed remains the same as the aircraft glides below the constant augmented altitude.

18. A system according to claim 10, in which said perspective radar is incorporated in a ship and said actual altitude generating means provides a constant signal corresponding to the fixed altitude of said antenna means on the ship above the water, and wherein said altitude control circuit comprises a summing circuit so that said simulated altitude signal is added to said fixed actual altitude signal to provide said augmented signal to said sweep and control circuit means.

19. A method of altering the display provided by a perspective radar system to provide a display in perspective as would appear if the observer were at a different position from his actual position comprising modifying the displayed positions of radar echo signals provided at the video input of the display to correspond substantially to those positions which would result if the radar antenna were at said different position whereby the targets viewed on the display assume the position they would if the observer were actually at said different position.

* * * * *